(12) United States Patent
Zohar

(10) Patent No.: US 8,749,088 B2
(45) Date of Patent: Jun. 10, 2014

(54) METHODS AND DEVICES FOR GENERATING ELECTRICITY FROM HIGH ALTITUDE WIND SOURCES

(76) Inventor: Ron Zohar, Rehovot (IL)

( * ) Notice: Subject to any disclaimer, the term of this patent is extended or adjusted under 35 U.S.C. 154(b) by 220 days.

(21) Appl. No.: 13/459,187

(22) Filed: Apr. 29, 2012

(65) Prior Publication Data

US 2013/0285385 A1 Oct. 31, 2013

(51) Int. Cl.
*F03D 9/00* (2006.01)
*H02P 9/04* (2006.01)
*F03D 11/04* (2006.01)
*F03D 1/04* (2006.01)

(52) U.S. Cl.
CPC *F03D 9/00* (2013.01); *F03D 11/04* (2013.01); *F05B 2240/40* (2013.01); *F05B 2240/98* (2013.01); *F05B 2240/922* (2013.01); *F03D 1/04* (2013.01); *Y02E 10/728* (2013.01); *Y02E 10/725* (2013.01)
USPC .......................................................... 290/55

(58) Field of Classification Search
CPC ............. F03D 11/04; F03D 1/04; F03D 9/00; F05B 2240/40; F05B 2240/98; F05B 2240/922; Y02E 10/728; Y02E 10/725
USPC .......................................... 290/55, 54, 44, 43
See application file for complete search history.

(56) References Cited

U.S. PATENT DOCUMENTS

| | | | | | |
|---|---|---|---|---|---|
| 2,078,532 | A | * | 4/1937 | Fischer | 244/61 |
| 4,572,972 | A | * | 2/1986 | Shoji | 327/566 |
| 4,659,940 | A | * | 4/1987 | Shepard | 290/55 |
| 6,254,034 | B1 | * | 7/2001 | Carpenter | 244/153 R |
| 8,018,079 | B2 | * | 9/2011 | Kelly | 290/1 R |
| 2003/0006615 | A1 | * | 1/2003 | Roberts et al. | 290/55 |
| 2010/0219644 | A1 | * | 9/2010 | Tigner | 290/55 |

* cited by examiner

*Primary Examiner* — Javaid Nasri

(57) ABSTRACT

The invention discloses devices and methods for allowing access to higher altitude winds for the purpose of electricity generation. A plurality of zeppelins is placed at altitudes in excess of one kilometer, with winds passing through hollow cavities that include wind turbines as well as electrical generators. The zeppelins may be moved from a first height to a second height in order to make most efficient use of prevailing winds at higher altitudes.

16 Claims, 6 Drawing Sheets providing a zeppelin, wherein the zeppelin includes a hollow cavity running the length of the zeppelin, wherein the cavity is surrounded by helium-filled inflatable walls

placing the zeppelin at a height between 1 and 20 kilometers, the height selected for highest prevalent wind speed

allowing wind at the height to rotate wind turbine blades placed near the opening of the cavity, the blades being attached to an axle adapted to rotate a rotor associated with an electrical generator

generating electricity through the action of the generator

transferring said electricity to a ground-based electrical grid

FIG. 5

METHODS AND DEVICES FOR GENERATING ELECTRICITY FROM HIGH ALTITUDE WIND SOURCES

FIELD AND BACKGROUND OF THE INVENTION

The present invention, in some embodiments thereof, relates to methods and devices for producing electricity from high altitude wind sources. In some embodiments, a plurality of unpiloted zeppelins or dirigibles with hollow cavities is employed to convert strong wind sources into usable electricity.

One of the most basic necessities form mankind is energy. Energy sources such as coal, oil, and natural gas, while abundant and in great use, are of necessity of finite amount. For decades, great efforts have been undertaken to develop "renewable" energy sources such as wind, wave, and solar. The results have been mixed, and today the percentage of energy used in the United States which is not based on some form of carbon is still in the single digits as a percentage of total power production. This situation is in need of redress.

While there are active wind farms in the United States, they have not come without controversy and problems. Legal fights have been associated with location selection of wind farms: oftentimes, the optimal place to put huge wind turbines is the least popular due to aesthetic, health, or land issues. Additionally, even working wind farms experience problems. During a particularly hot Texas summer in 2011, wind turbines succeeded in producing only a fraction of their rated power output. Very thin hot air apparently was unable to turn the turbine rotor blades in a manner that could yield higher amounts of electricity.

One approach to addressing both the land use issue as well as the efficiency of electrical generation is to move turbines higher in the atmosphere. By doing so, one has access to higher speed winds while at the same time significantly freeing up land from fixed, massive vertical turbines.

U.S. Pat. No. 4,659,940 to Shepard discloses a method and apparatus for the production of electrical power from high altitude winds. A kitecraft secured to a ground tether supports a cylindrical drum rotatable about a horizontal shaft. The drum comprises a plurality of wheels interconnected by airfoils positioned about the cylindrical surface of the drum. Wind action on the airfoils rotates the drum about the horizontal shaft and turns generators to provide electrical power. The kitecraft and drum assembly is constructed to the maximum practical extent from tension members to reduce weight.

U.S. patent application Ser. No. 10/064,806 to Roberts & Shepard teaches tethered wind supported flying electric generators (FEGS) capable of deriving power from high altitude winds that are held stable in precisely controlled positions in spite of wind fluctuations and temporary wind absence. FEGs are windmill-like rotorcraft, somewhat resembling helicopters, which are raised to a strong wind altitude using electric motors driving the rotors, each craft powered through tethers) from a corresponding single point on the ground. Then the rotorcraft is tilted at an angle, the wind turns the rotors, and thus keeps the craft aloft and sends power back to the ground, now using the motors as generators. Precise craft geographic position, altitude and attitude are determined by various sensing means. Computer logic, provided with this information and wind and other weather data, command individual craft control functions and thus may also command arrays of these FEGs to maintain precise geographic and altitude locations or be grounded under tether winch control when necessary.

U.S. Pat. No. 4,572,972 to Shepard describes a wind-operated power-generating module for operation at high altitudes such as 1000 meters comprising a frame structure mounting a pair of vertically-separated parallel shafts around which pass endless belts supporting a series of parallel, elongate wing-like elements for movement around a closed path including the parallel shafts. Wind flow drives these elements around the closed path, to enable electrical power to be generated, and also provides lift to hold the module up at the appropriate high altitude. A number of such modules are tethered in fixed positions in the sky, and are controllable as is appropriate to accommodate changing wind conditions.

U.S. patent application Ser. No. 12/711,847 to Tigner teaches power generation systems comprising an array or rotary-wing kites that may be coupled to ground-based spools via tethers. The rotational motion of the spools may be converted into electrical energy via one or more generators.

U.S. Pat. No. 6,254,034 to Carpenter describes tethered aircraft blown by wind downwind at a controlled rate for maximal mechanical energy. Travel downwind allows for generation of energy into a spooling system used to release a tether wire attached to the aircraft. After downwind travel, the aircraft is brought again upwind at a later time so as to repeat the energy-generation process.

SUMMARY OF THE INVENTION

It is therefore a purpose of the present invention, in some embodiments, to describe methods and devices for creating electrical energy from high altitude wind sources. In some embodiments of the invention, dirigibles may be moved from a first altitude to a second altitude to take advantage of higher wind speed.

The invention provides for a device for the production of electricity from a high altitude wind source, including: a helium-filled zeppelin including a hollow cavity running the length of the zeppelin; stabilizing elements on the zeppelin adapted to keep said zeppelin in a predetermined orientation relative to the ground; a plurality of wind turbine blades placed at an opening of the cavity, wherein the cavity is adapted to face the direction of incoming wind; a generator located within the cavity, wherein a portion of the generator is adapted to be rotated through the action of an axle associated with the turbine blades; an electrical cable adapted to transfer by the generator to a ground installation; and, a control cable adapted to hold move the zeppelin at a height of one to twenty kilometers above the ground.

In one aspect of the device, there is additionally a cooling unit placed in proximity to the generator.

In another aspect of the device, the control cable is attached to a winch.

In another aspect of the device, the zeppelin has a length of seven meters.

In another aspect of the device, the hollow cavity has a diameter of one meter.

In another aspect of the device, the zeppelin is realized as a plurality of zeppelins.

In another aspect of the device, the portion of the generator is a rotor.

In another aspect of the device, the zeppelin is moved to an altitude with the highest prevalent wind velocity.

In another aspect of the device, there is additionally a control unit adapted to control the height and direction of said zeppelin.

The invention additionally includes a method for converting high altitude wind into electrical energy for land-based use, including the following: providing a zeppelin, wherein the zeppelin includes a hollow cavity running the length of the zeppelin, wherein the cavity is surrounded by helium-filled inflatable walls; placing the zeppelin at a height between 1 and 20 kilometers, the height selected for highest prevalent wind speed; allowing wind at the height to rotate wind turbine blades placed near the opening of the cavity, the blades being attached to an axle adapted to rotate a rotor associated with an electrical generator; generating electricity through the action of the generator; and, transferring said electricity to a ground-based electrical grid.

In one aspect of the method, there is additionally the step of changing the altitude of the zeppelin during production of the electricity.

In another aspect of the method, the zeppelin is realized as a plurality of zeppelins.

In another aspect of the method, the generator is realized as a plurality of generators.

In another aspect of the method, there is additionally providing a controller unit to control the height, orientation and electricity production of the zeppelin.

In another aspect of the method, the controller unit includes a computing element.

The invention includes for a device for the production of electricity from a high altitude wind source over a body of water, including: a gas-filled zeppelin including a hollow cavity running the length of the zeppelin; stabilizing elements on the zeppelin adapted to keep said zeppelin in a predetermined orientation relative to the ground; wind turbine blades placed at an opening of the cavity, wherein the cavity is adapted to face the direction of incoming wind; a generator located within the cavity, wherein a portion of the generator is adapted to be rotated through the action of an axle associated with the turbine blades; an electrical cable adapted to transfer by said generator to a ground installation; and, a control cable adapted to hold move the zeppelin at a height of one to twenty kilometers above a body of water.

In one aspect of the device, the gas is realized as helium.

In another aspect of the device, the body of water is realized as an ocean.

In another aspect of the device, the zeppelin is realized as a plurality of electricity-generating zeppelins.

Unless otherwise defined, all technical and/or scientific terms used herein have the same meaning as commonly understood by one of ordinary skill in the art to which the invention pertains. "High altitude" as defined in this invention may mean any altitude over one kilometer above the Earth's surface. Gears and other components traditionally associated with terrestrial wind turbines may not be shown in some figures so as to make the figures easier to understand.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. It is noted that similar elements in various drawings will have the same number, advanced by the appropriate multiple of 100.

In the drawings:

FIG. 5 shows a flowchart associated with a method of the instant invention; and, FIG. 6 shows a schematic view of an embodiment associated with an example of the instant invention.

DESCRIPTION OF SPECIFIC EMBODIMENTS OF THE INVENTION

The present invention, in some embodiments thereof, relates to devices and methods to allow optimal conversion of prevalent wind energy into electrical or rotational energy. In the instant invention, annular-shaped zeppelins with hollow cores are placed in the atmosphere generally over 1 kilometer from the Earth, where wind flow is significantly higher than at the terrestrial level. The instant invention allows for wind-based energy production without the difficulties or health risks associated with land-based wind farms. The electricity-generating zeppelins will be held in the atmosphere and moved to a height which yields optimal electricity production. The only land footprint from a zeppelin will be its winch, whose size is significantly smaller than the zeppelin, and as such net land required for floating an armada of such zeppelins is relatively small.

First Embodiment

Figure 1:
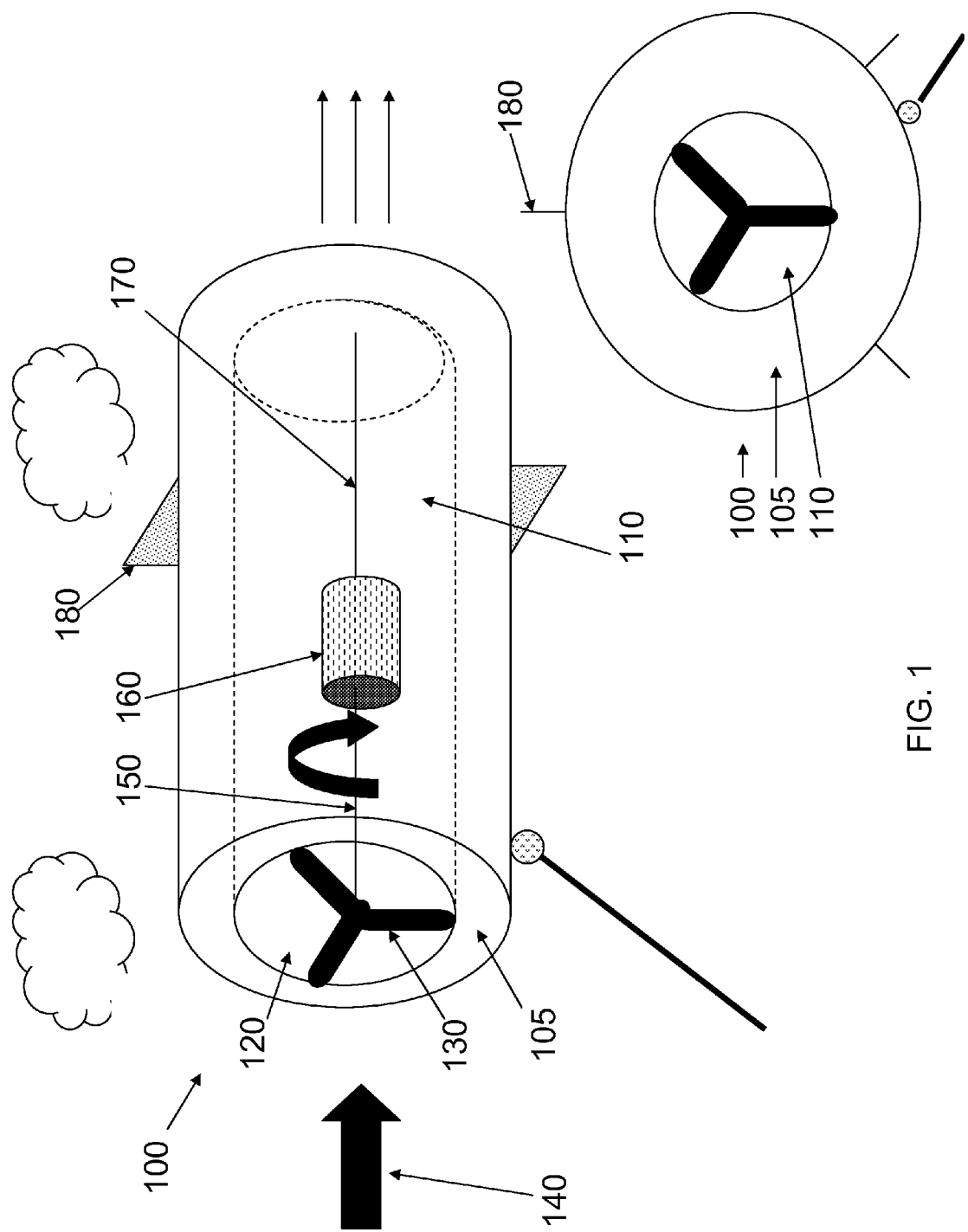
FIG. 1 shows a schematic view of an embodiment of the instant invention

FIG. 1 shows an embodiment of the instant invention. The figure shows a zeppelin 100 according to an embodiment of the present invention. The zeppelin 100 includes a gas-filled wall 105 which encompasses a cavity 110. The cavity 110 runs the length of the zeppelin 100 which is open on its two horizontal ends. At one end 120 is placed a multi-blade turbine 130 which is adapted to rotate in the direction of the wind 140. Attached to the turbine 130 is a shaft 150 which can rotate a portion of a generator 160 which is generally placed in the cavity 110 though in some embodiments it may be located elsewhere on the zeppelin 100 or completely removed from the zeppelin 100. The generator 160 generators rotation energy and in some embodiments electricity which is passed through a cable 170 to a ground station (not shown) for introduction into a local, regional, or national electric grid (not shown). The zeppelin 100 may including stabilizing elements 180 which are placed so as to keep the zeppelin 100 in a proper orientation with the cavity 110 essentially parallel to the ground. A typical zeppelin 100 is seven meters in length, with a cavity 110 having a one meter diameter. The views in FIG. 1 are side-on and front-on, as shown.

Second Embodiment

Figure 2:
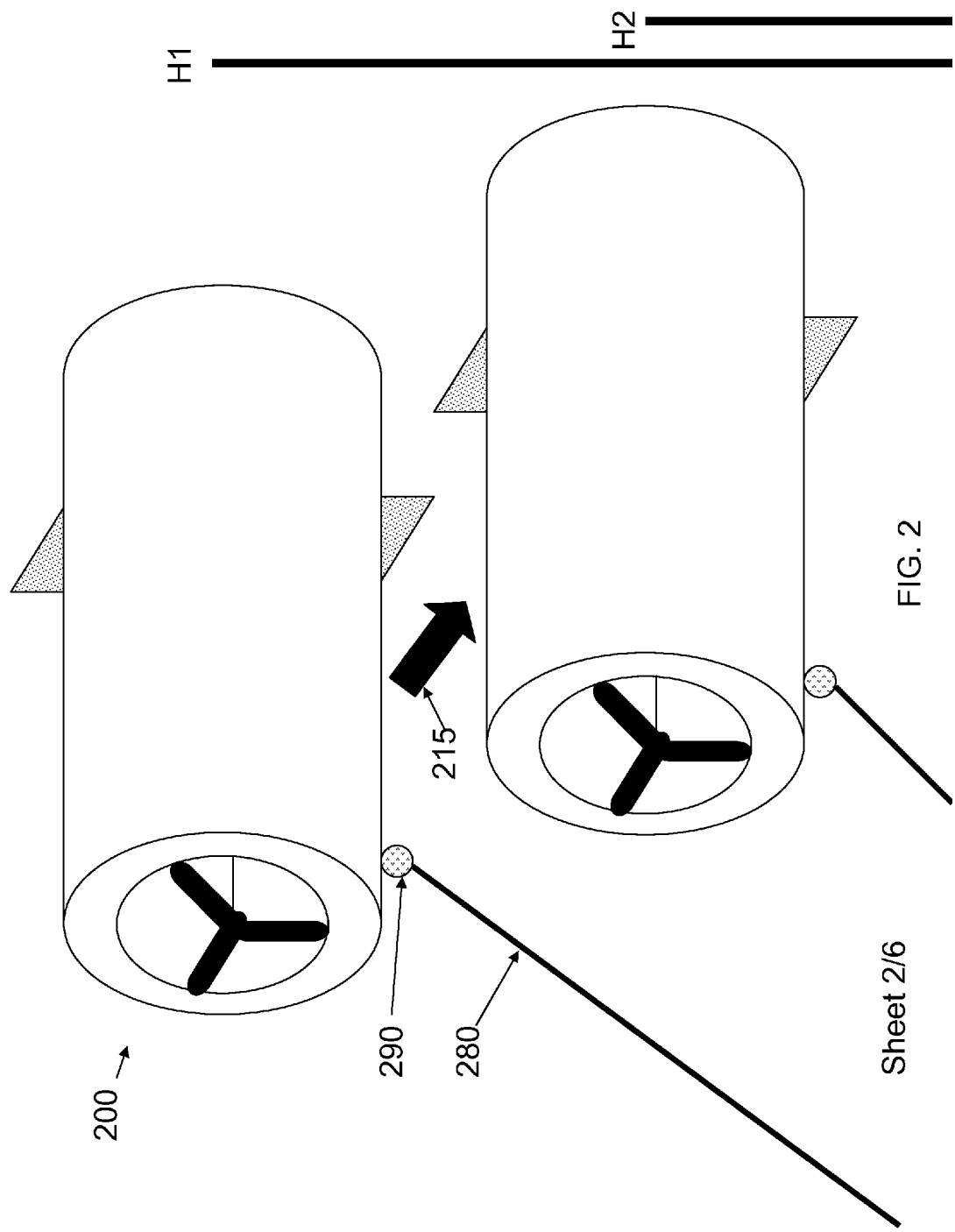
FIG. 2 shows a schematic view of an alternative embodiment of the instant invention.

Attention is turned to FIG. 2 which shows a second embodiment of the instant invention. A zeppelin 200 is placed at a predetermined height H1. At that height, optimal wind flow has been detected. After a period of time, a lower height, H2 is shown to have better wind speed. The zeppelin 200 is lowered as shown 215 into a position at H2 so as to allow for continued optimal wind-based electricity production. The zeppelin 200 may be moved by aid of its control cable 280 which may be spun in or spun out by the aid of a ground-based or otherwise fixed winch (not shown). The zeppelin 200 may be placed at a plurality of heights, each change driven by changes in wind flow at heights of one to twenty or more kilometers above the Earth. It is noted that the zeppelin 200 includes a swivel lock 290 which allows for the zeppelin 200 to move freely around its control cable 280 so as to face its turbines 230 into the wind. A zeppelin may include a plurality of control cables 280 if required.

Third Embodiment

Figure 3:
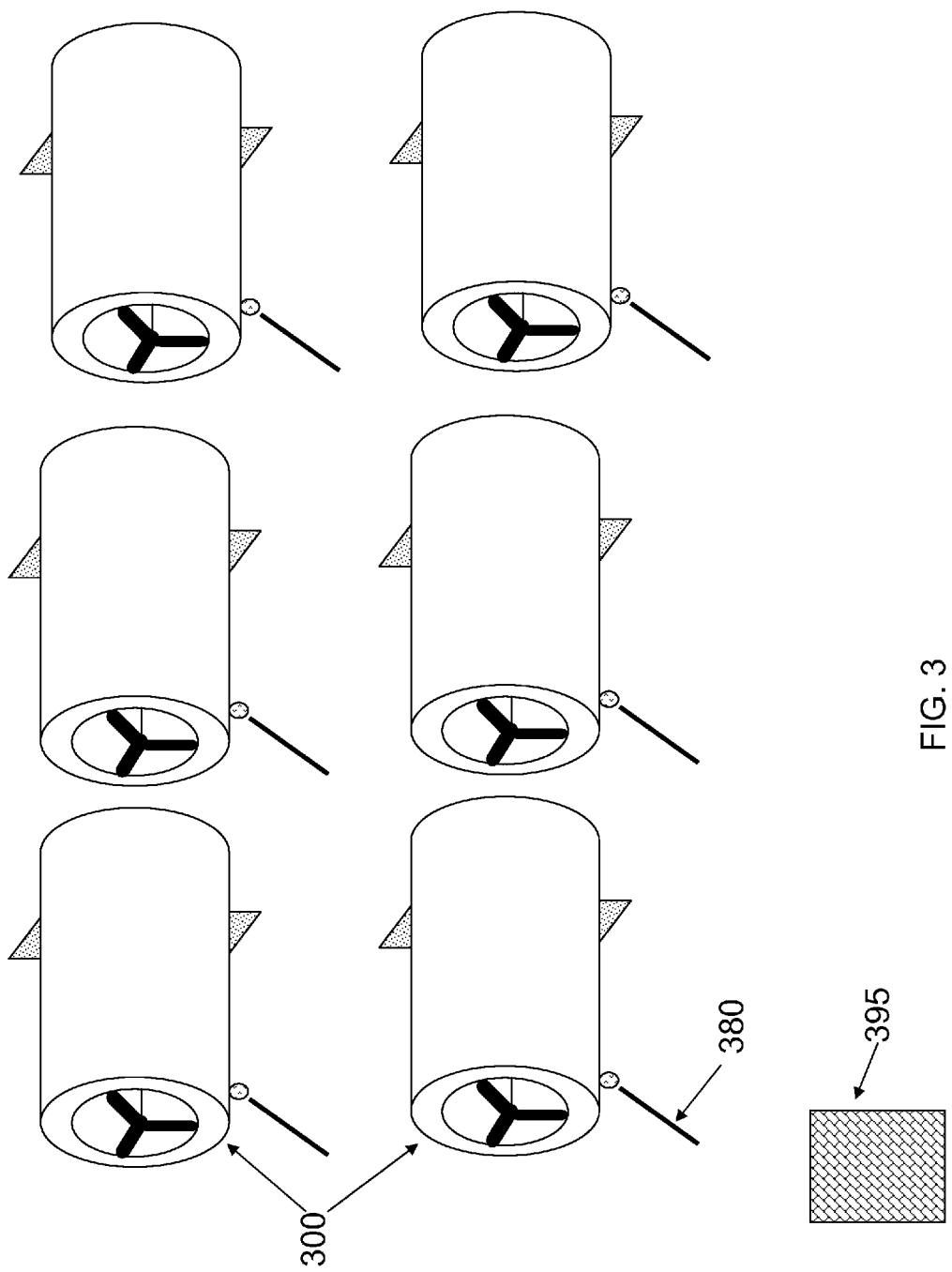
FIG. 3 shows a schematic view of an alternative embodiment of the instant invention.

Attention is turned to FIG. 3 which shows a schematic view of an embodiment of the instant invention. A plurality of zeppelins 300 is present at a predetermined height above the Earth. The zeppelins 300 may all be at the same height or may be placed at a plurality of heights for either efficiency or safety reasons. Each zeppelin 300 is tethered to the earth through a control cable 380 and all of the zeppelins 300 are under the control of the controller unit 395. A controller unit generally has a computer component which may turn winches (not shown) to either raise or lower one or more zeppelins. The controller unit 395 may also receive data on wind speed as a function of altitude and use this information to change the position and/or orientation of zeppelins in use for rotational energy or electrical energy generation. The controller unit 395 may ground the zeppelins 300. The controller unit 395 is capable of performing diagnostic tests on each zeppelin 300 and can alert a technician should a zeppelin 300 malfunction and/or be in need of repair. By utilizing a plurality of zeppelins 300 as shown in FIG. 3, one may generate megawatt levels of electrical power without tying up ground or causing eye sores related to fixed wind turbines. Additionally, by moving wind turbines up into the lower atmosphere, there is no chance of health damage from turbine noise as has been described in the scientific and medical literature.

Fourth Embodiment

Figure 4:
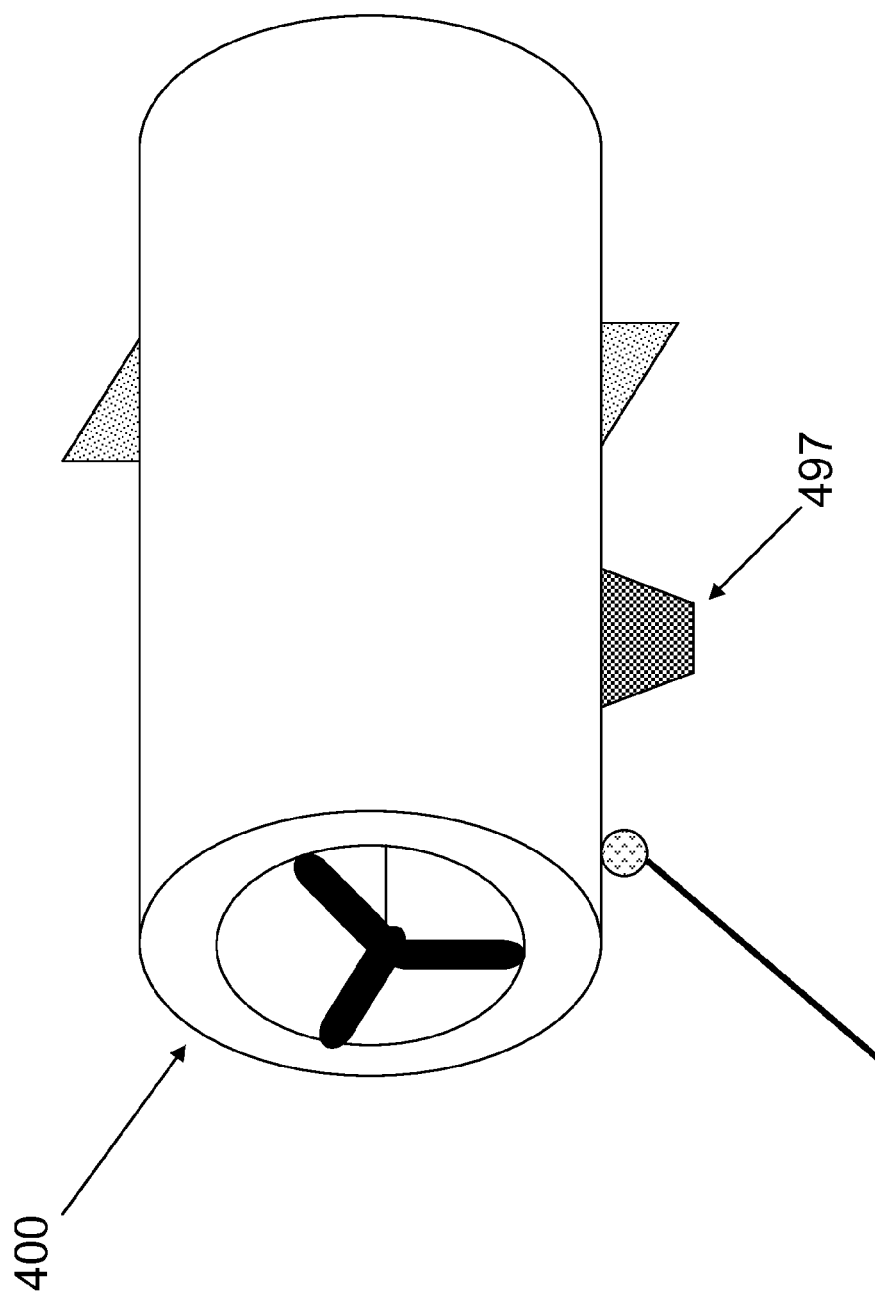
FIG. 4 shows a schematic view of an alternative embodiment of the instant invention.

Attention is turned to FIG. 4 which shows a schematic view of an embodiment of the instant invention. A zeppelin 400 includes a small motor 497 which may be employed to move a zeppelin either in height or in orientation relative to the wind. The motor may be powered by any means, including but not limited to electricity generated by the zeppelin 400 itself The motor 497 may be positioned on the zeppelin 400 to allow for optimal maneuverability of the zeppelin 400 to allow for the most efficient wind collection for electricity production.

Fifth Embodiment

FIG. 5 shows a flowchart of a method associated with the instant invention. The method includes the following steps: providing a zeppelin, wherein the zeppelin includes a hollow cavity running the length of the zeppelin, wherein the cavity is surrounded by helium-filled inflatable walls; placing the zeppelin at a height between 1 and 20 kilometers, the height selected for highest prevalent wind speed; allowing wind at the height to rotate wind turbine blades placed near the opening of the cavity, the blades being attached to an axle adapted to rotate a rotor associated with an electrical generator; generating electricity through the action of the generator; and, transferring said electricity to a ground-based electrical grid. The method may be applied to a plurality of zeppelins and may include additional steps such as changing the height of the zeppelin or measuring wind speed as a function of altitude prior to moving zeppelins to a new altitude. The method may be applied over land or water and the zeppelins may be filled with any gas, though helium is the most economical and safest, as it is not flammable.

It is expected that during the life of a patent maturing from this application variable mold technologies will be developed and the scope of the term of the invention is intended to include all such new technologies a priori.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

All technical terms may have their normal meaning as applied to the art unless otherwise specified. "Infrastructure elements" may refer to cables, pipes, wires, and the like traditionally used in construction. Such cables, pipes, and wires may move water, telephone connections, electricity, TV connections or other items.

EXAMPLE

Figure 6:
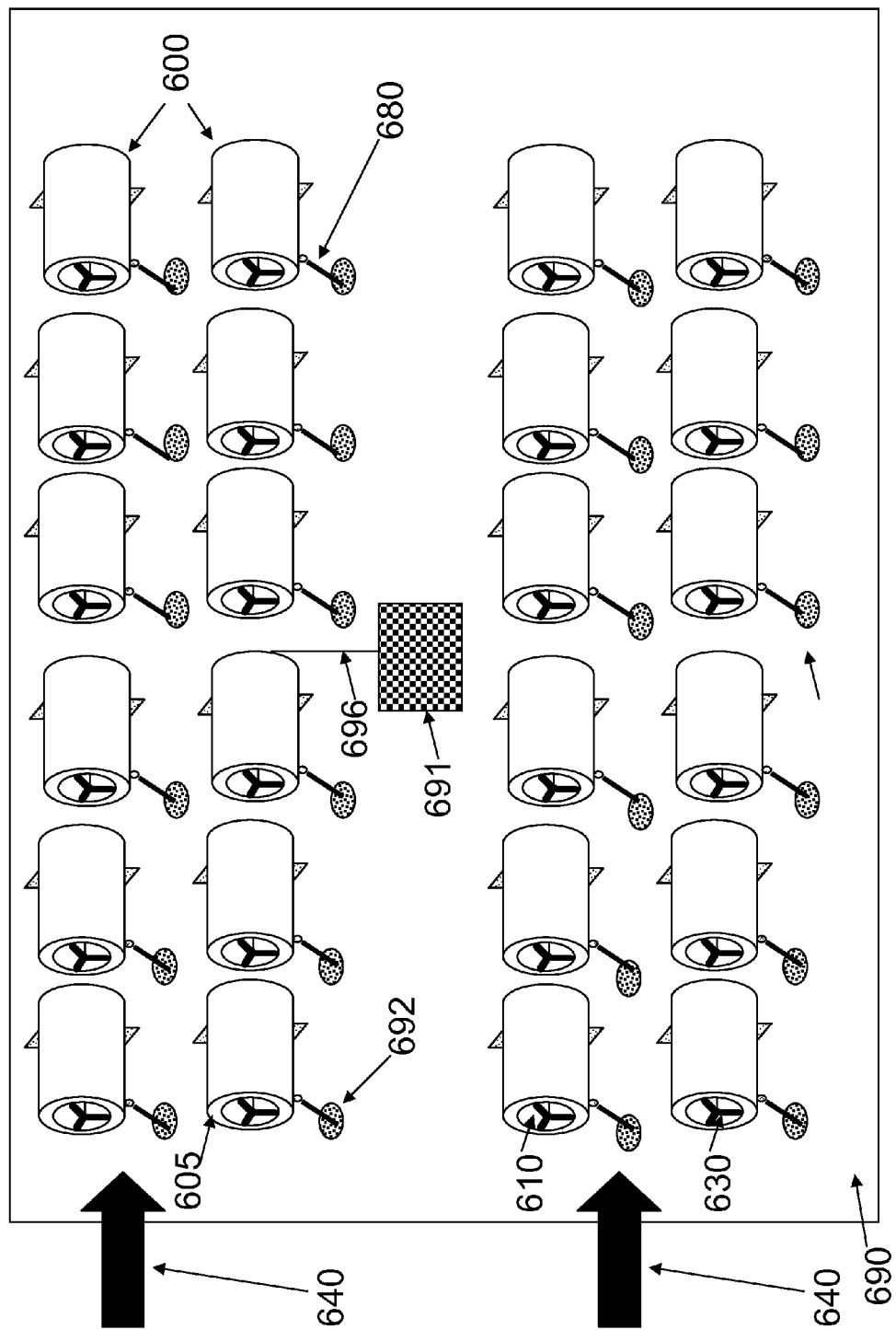

A non-limiting example of an embodiment of the instant invention is herewith offered in conjunction with FIG. 6. Note that FIG. 6 is an aerial view of a "wind farm' based on an embodiment of the present invention. Additionally, some elements in the figure may be shown only in part so as to allow for the easier viewing and understanding of the example. A 3 kilometer by 2 kilometer field 690 is secured. In the middle of the field is placed an electrical power station 691 with access to an electrical grid (not shown). Winch bases 692 are placed at even spacing around the power station 691 throughout the field 690. A plurality of zeppelins 600 is provided, each zeppelin 600 being attached via a control cable 680 to a winch base 692. The zeppelins 600 all have annular shape with helium-filled walls 605 and a hollow central cavity 610. Turbines 630 drive electrical generators (not shown) which create electricity from wind 640 power, the electricity being sent by each zeppelin 600 via an electrical cable 696 to the power station 691, where it may be further sent along to an electrical grid. In some future embodiments, electricity may be sent wirelessly from the zeppelins 600 to the power station 691. The control cable 680 may be winched higher or lower to allow the zeppelins 680 to reach the jet stream, where winds are typically 100 mph or higher. The zeppelins 600 may automatically align themselves into the wind or may be directed into the wind via the action of a controller unit, which may be located in the power station 691. The generally annular structure of the zeppelins 600 may be modified for aerodynamic or other considerations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Zeppelins may be combined with other wind-based or solar-based systems for electricity generation. Solar panels could be placed on the outer surfaces of zeppelins for generating electricity from sunlight as well as from wind that passes through the cavities of the zeppelins as described in the aforementioned embodiments.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Various embodiments and aspects of the present invention as delineated hereinabove and as claimed in the claims section below find experimental support in the following example.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A device for production of electricity from a high altitude wind source, including:
    a helium-filled zeppelin including a hollow cavity running a length of said zeppelin;
    stabilizing elements on said zeppelin adapted to keep said zeppelin in a predetermined orientation relative to ground;
    a plurality of wind turbine blades placed at an opening of said cavity, wherein said cavity is adapted to face a direction of incoming wind;
    a generator located within said cavity, wherein a portion of said generator is adapted to be rotated through an action of an axle associated with said turbine blades;
    an electrical cable adapted to transfer by said generator to a ground installation; and,
    a control cable adapted to hold move said zeppelin at a height of one to twenty kilometers above the ground.

2. The device according to claim 1, wherein said control cable is attached to a winch.

3. The device according to claim 1, wherein said zeppelin has a length of seven meters.

4. The device according to claim 1, wherein said hollow cavity has a diameter of one meter.

5. The device according to claim 1, wherein said zeppelin is realized as a plurality of zeppelins.

6. The device according to claim 1, wherein said zeppelin is moved to an altitude with a highest prevalent wind velocity.

7. The device according to claim 6, further including a controller unit adapted to control the height and direction of said zeppelin.

8. A method for converting high altitude wind into electrical energy for land-based use, including the following:
    providing a zeppelin, wherein said zeppelin includes a hollow cavity running a length of the zeppelin, wherein said cavity is surrounded by helium-filled inflatable walls;
    placing said zeppelin at a height between 1 and 20 kilometers, said height selected for highest prevalent wind speed;
    allowing wind at said height to rotate wind turbine blades placed near the opening of said cavity, said blades being attached to an axle adapted to rotate and associated with an electrical generator;
    generating electricity through an action of said generator; and,
    transferring said electricity to a ground-based electrical grid.

9. The method according to claim 8, further including the step of changing the altitude of said zeppelin during production of said electricity.

10. The method according to claim 8, wherein said zeppelin is realized as a plurality of zeppelins.

11. The method according to claim 8, wherein said generator is realized as a plurality of generators.

12. The method according to claim 8, further including providing a controller unit to control the height, orientation and electricity production of said zeppelin.

13. A device for production of electricity from a high altitude wind source over a body of water, including:
    a gas-filled zeppelin including a hollow cavity running a length of said zeppelin;
    stabilizing elements on the zeppelin adapted to keep said zeppelin in a predetermined orientation relative to the ground;
    wind turbine blades placed at an opening of said cavity, wherein said cavity is adapted to face a direction of incoming wind;
    a generator located within said cavity, wherein a portion of said generator is adapted to be rotated through an action of an axle associated with said turbine blades;
    an electrical cable adapted to transfer by said generator to a ground installation; and,
    a control cable adapted to hold move said zeppelin at a height of one to twenty kilometers above a body of water.

14. The device according to claim 13, wherein said gas is realized as helium.

15. The device according to claim 13, wherein said body of water is realized as an ocean.

16. The device according to claim 13, wherein said zeppelin is realized as a plurality of electricity-generating zeppelins.

* * * * *